United States Patent
Little

[15] 3,697,811
[45] Oct. 10, 1972

[54] STATIC NETWORK PROTECTIVE RELAY

[72] Inventor: David W. Little, Lansdowne, Pa.

[73] Assignee: General Electric Company

[22] Filed: Sept. 10, 1971

[21] Appl. No.: 179,500

[52] U.S. Cl. ................. 317/27 R, 317/26, 317/33 R, 317/36 D
[51] Int. Cl. ............................................. H02h 3/36
[58] Field of Search............ 317/27 R, 36 D, 33 R, 26

[56] References Cited

UNITED STATES PATENTS

| | | | |
|---|---|---|---|
| 3,374,399 | 3/1968 | Dewey | 317/36 D |
| 3,401,307 | 9/1968 | Hoel | 317/27 R |
| 3,532,935 | 10/1970 | Waldron | 317/36 D |

Primary Examiner—James D. Trammell
Attorney—J. Wesley Haubner et al.

[57] ABSTRACT

A static protective relay comprises a power directional unit for controlling a circuit breaker which couples a primary feeder or a source of supply of a 3-phase power distribution system to an alternating current secondary network through a network transformer. The power directional unit senses reverse power flow above a preselected threshold level from the network to the network transformer to energize a tripping coil of the circuit breaker. Included in the power directional unit is a voltage deriving circuit producing a voltage proportional to the system current through the circuit breaker, a modulator which modulates the voltage by a voltage proportional to the system voltage at the circuit breaker to obtain an output proportional to real power flow through the circuit breaker, and a detector which energizes the tripping coil upon the presence of a reverse power flow signal from the modulator. The power directional unit also includes a source of variable bias comprising circuitry for providing a bias signal which varies both in magnitude and in phase and is a function of the phase angle of the phase current. The variable bias is supplied as an input to the detector to provide a power directional unit exhibiting improved sensitivity to highly capacitive phase currents.

11 Claims, 9 Drawing Figures

3,697,811
Fig. 1.
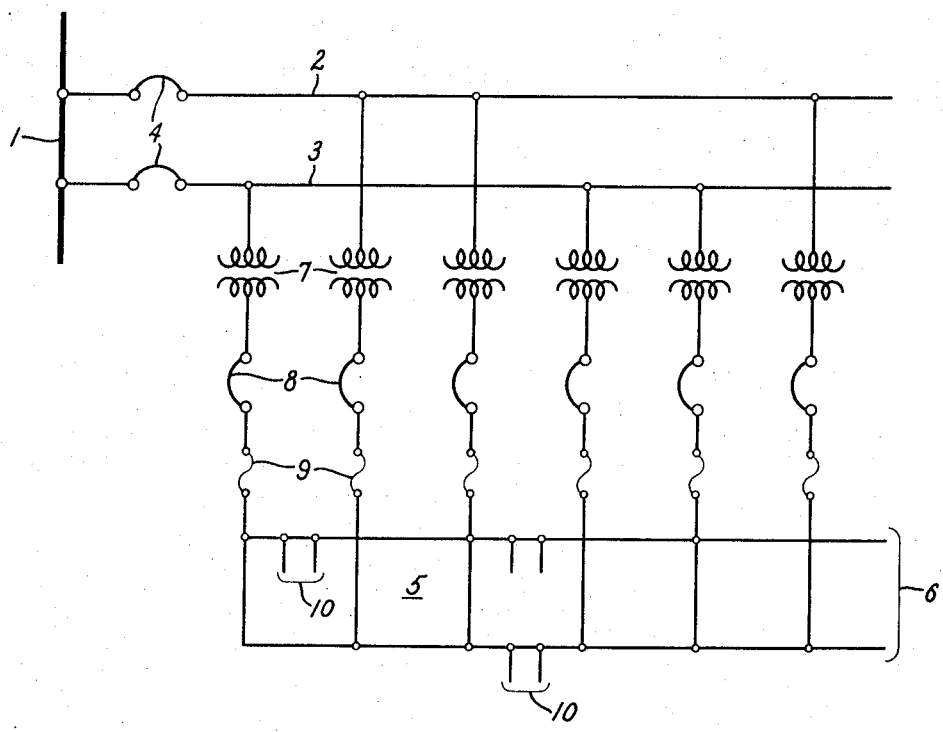
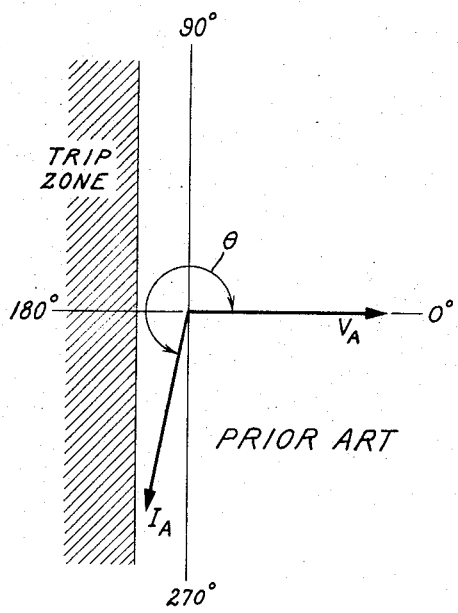
Fig. 8.
PRIOR ART
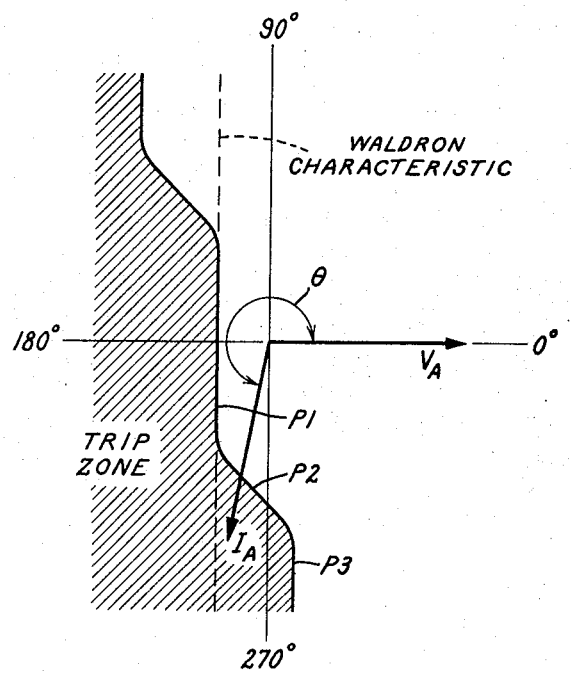
Fig. 9.
WALDRON CHARACTERISTIC

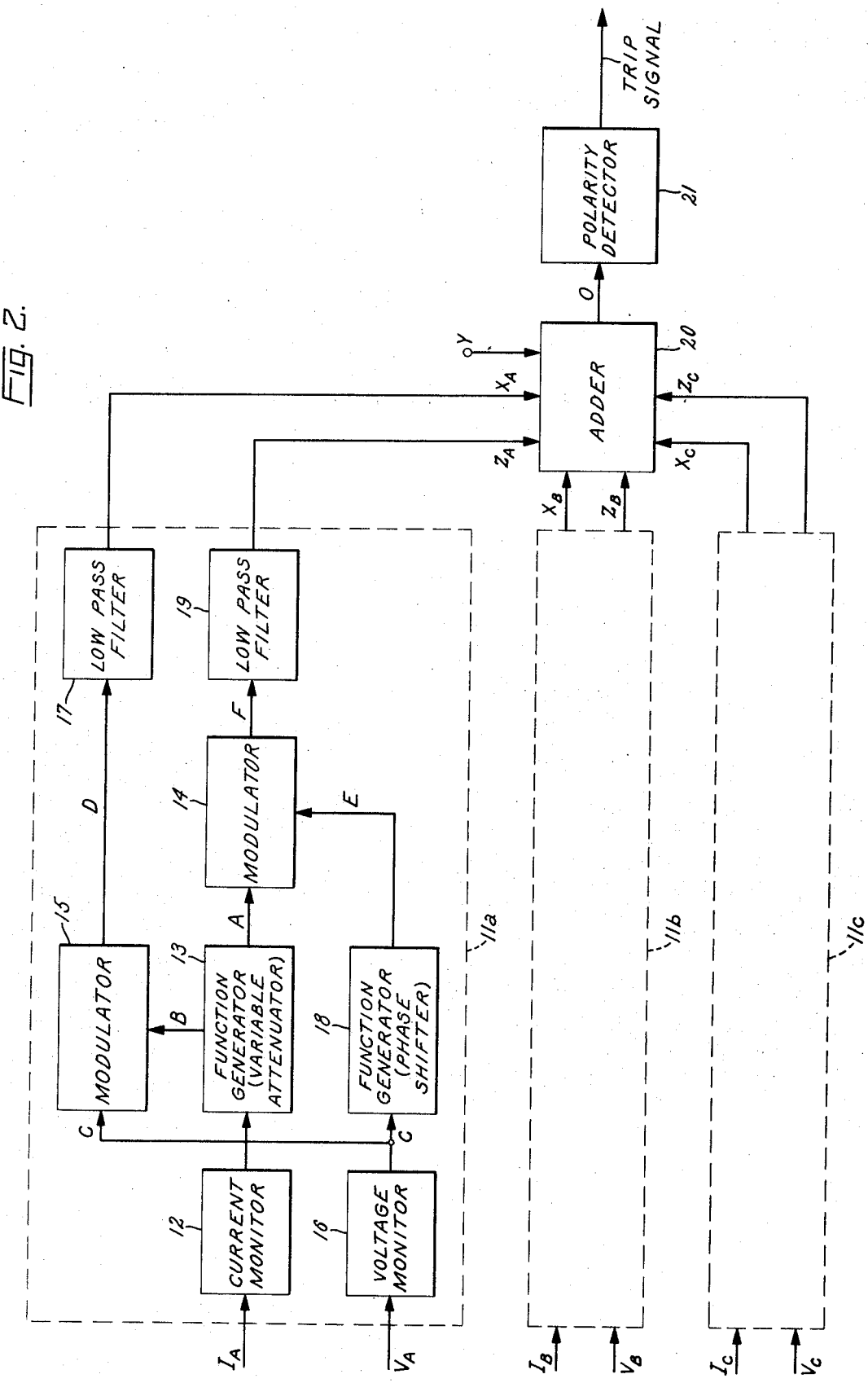

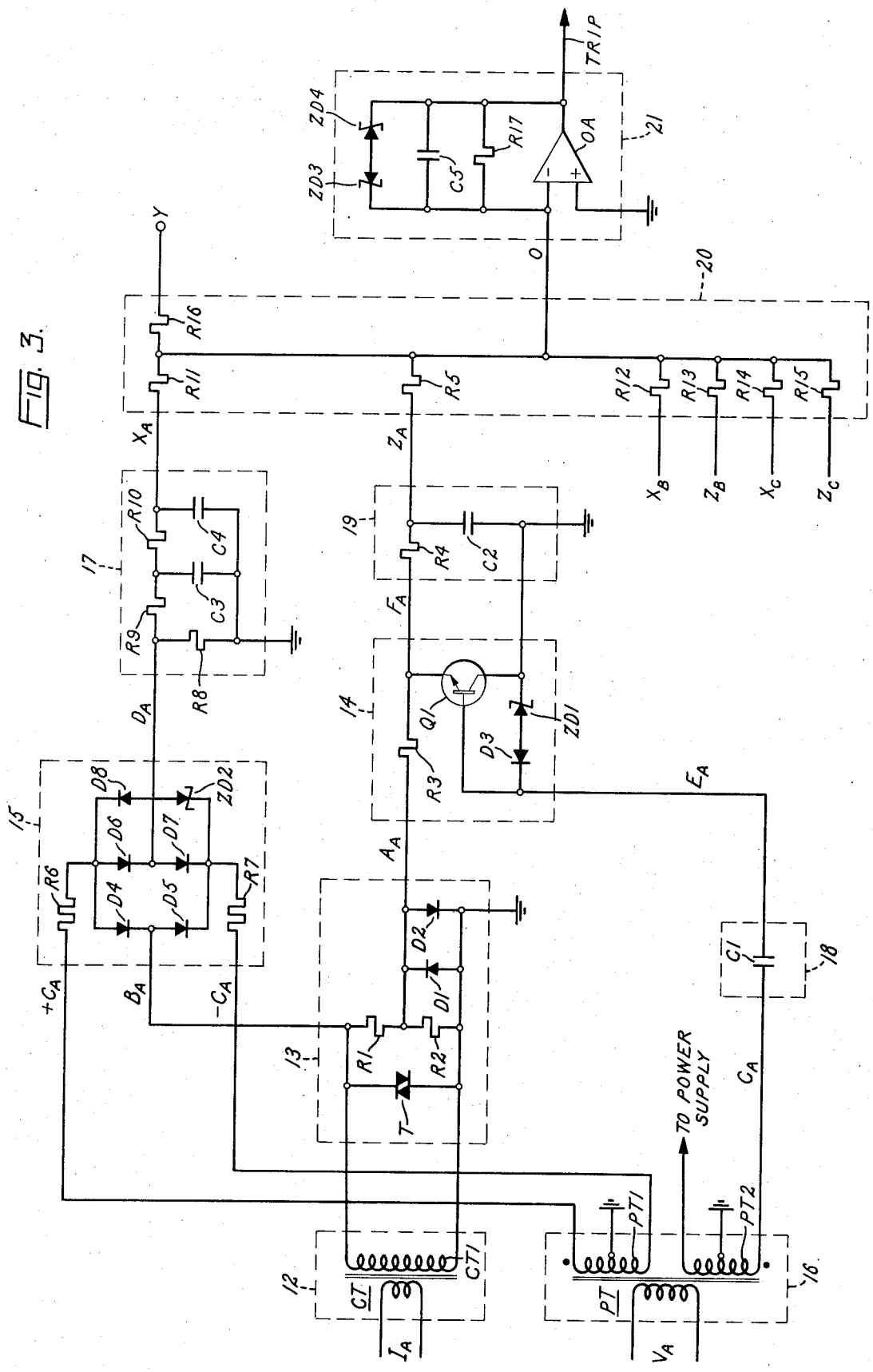

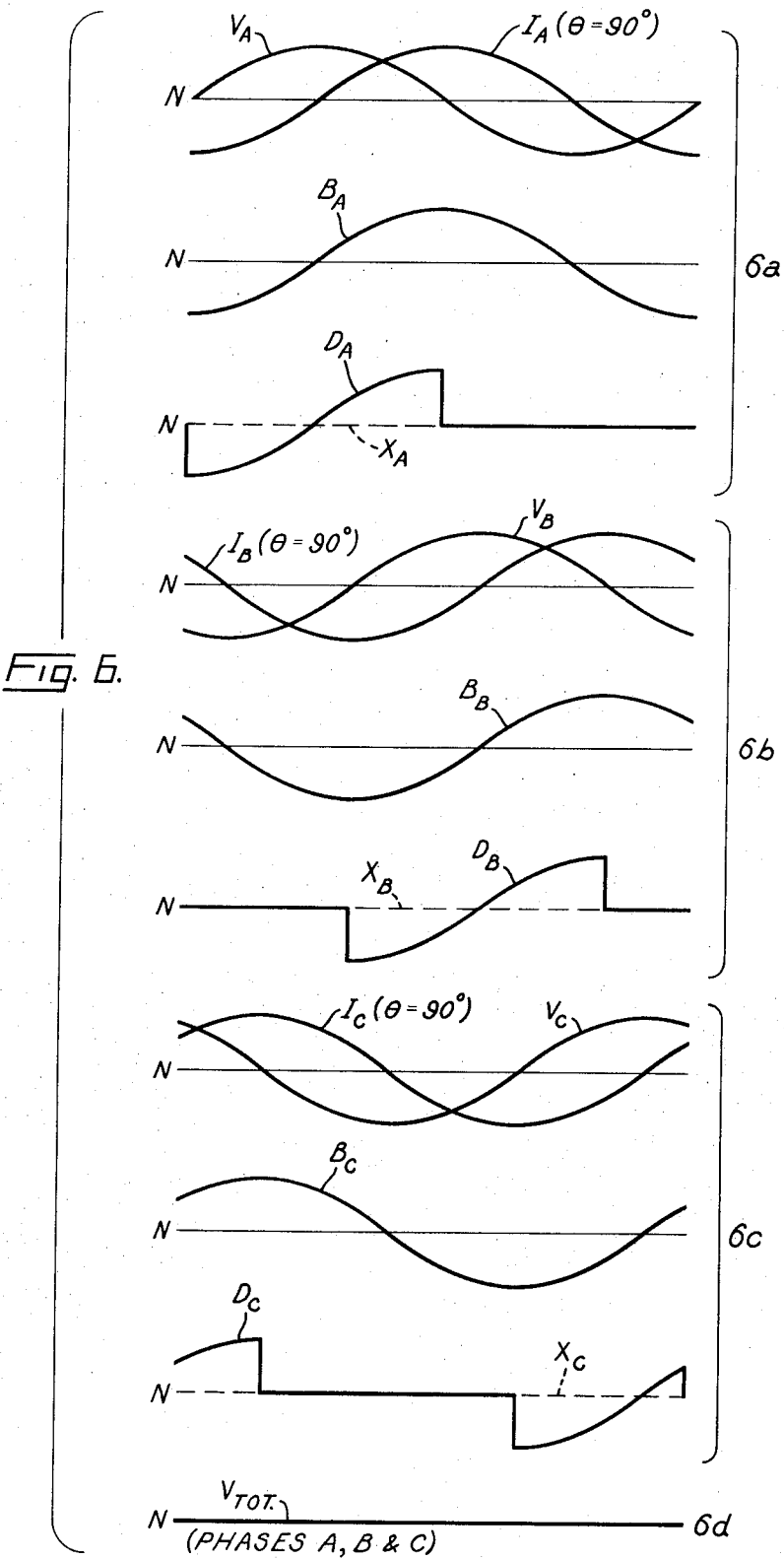

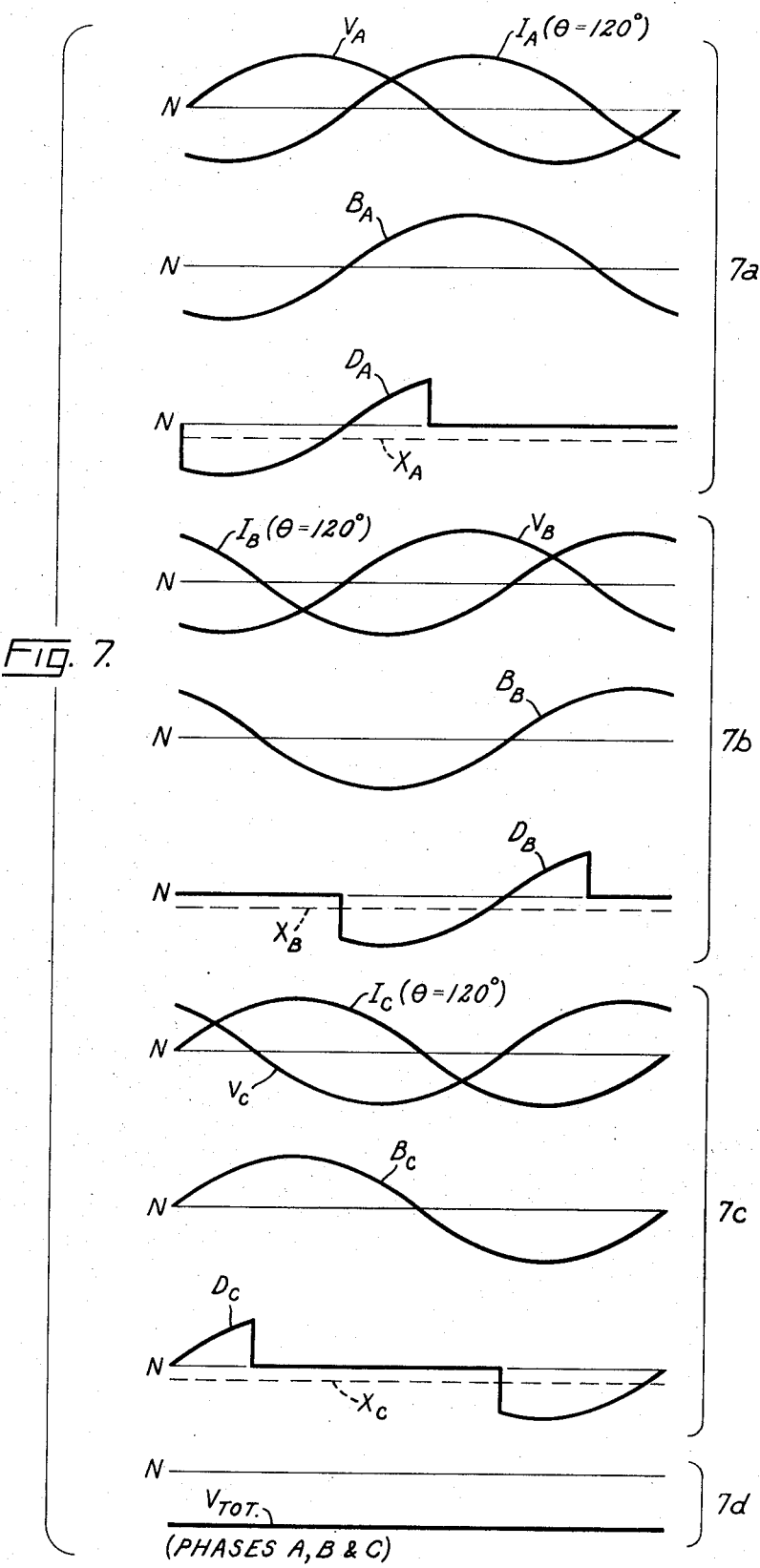

STATIC NETWORK PROTECTIVE RELAY

BACKGROUND AND OBJECTS OF THE INVENTION

This invention relates generally to electric power distribution systems including alternating current secondary networks and to a network protector which connects a primary feeder to such a secondary network, and more particularly it relates to an improved power directional unit therefor. The following published art now known to the applicant are exemplary of prior art approaches this area of technology: U.S. Pat. No. 2,401,307 (Hoel); U.S. Pat. No. 3,532,935 (Waldron).

An alternating current secondary network comprises a grid of interconnected cables which are energized at a voltage suitable for distribution to a plurality of residential, industrial and commercial loads. To ensure continuity of service in a heavy load-density municipal area, the grid is supplied from primary or high voltage feeders at many points. When a source of supply or primary feeder is lost, the load formerly supplied by that feeder is absorbed by the other, remaining feeders. Each primary feeder is connected to the network through at least one network transformer, network protector, and a set of fuses.

A protective relay associated with the network protector and the fuses is designed to maintain the network in electrical connection with the primary feeder only for certain well-defined conditions of operation (e.g. any network transformer which is not delivering power to the network is to be disconnected therefrom).

In U.S. Pat. No. 3,532,935-Waldron, assigned to the same assignee as my invention, there is disclosed and claimed a static protective relay which exhibits numerous improvements over the prior art electromechanical relays. That static relay includes, among other things, a power directional unit for controlling a circuit breaker (called a network protector) which couples a primary feeder or a source of supply of a 3-phase power distribution system to an alternating current secondary network through a network transformer. The power directional unit senses reverse power flow above a preselected threshold level from the network to the network transformer to energize a tripping coil of the network protector. Included in the power directional unit is a voltage deriving circuit producing a voltage proportional to the system current through the network protector, a modulator which modulates that voltage by a voltage proportional to the system voltage at the network protector to obtain an output proportional to the real power flow through the network protector, and a detector which energizes the tripping upon the presence of a reverse power flow signal from the modulator. The reverse power flow signal is provided whenever reverse power flow is sensed as exceeding a preselected threshold level as defined by a fixed bias signal provided in the power directional unit.

The fixed bias signal defines the minimum phase current needed to cause the network protector to open and is provided to ensure that the network protector does not cause the breaker to open in response to a very low level of reverse power flow since such an occurrence could result from conditions which do not necessitate network deenergization (e.g. coasting load motors, noise, etc.). Furthermore, at very low levels of current the sense phase angle may be false due to the magnetization current in the current transformer which is monitoring the phase current.

The tripping characteristics of the power directional unit of Waldron, when plotted on a polar graph, in the normal operating range generally approximates a straight line running parallel to the 90°–270° line but is slightly offset to the left therefrom by an amount equal to the amount of fixed bias. The area to the left of that line defines the trip range of the network protector and any phase current vector terminating in this area will cause the network protector to open.

It has been determined that a power directional unit exhibiting such a characteristic may provide less than optimum tripping operation in certain unusual events. For example, if a fault should arise in the system the feeder circuit breaker will open. Once the fault has cleared if the network protector is closed the network may begin to supply some reverse power to the long, highly capacitive power line between it and the feeder breaker (i.e. charge the power line). The current vector resulting from the reverse power flow may be relatively large (e.g. 100 amperes) and at a phase angle slightly less than 270° (due to the highly capacitive power line) so that it lies completely without the trip range of the power directional unit. Accordingly, the network protector will not trip and the line will be charged by the reverse power flow. Such an occurrence is undesirable.

If the power directional unit were modified to exhibit a tripping characteristic that is shifted to the right in the vicinity of the 270° line, tripping would occur in the above described situation.

Accordingly, it is a general object of my invention to provide a network protector with a power directional unit which is more sensitive to highly capacitive current than prior art units.

Although it is desirable to shift the tripping characteristic to the right in the vicinity of the 270° line it is also important that in the intermediate vicinity of the origin the tripping characteristic be undisturbed (i.e., remain slightly offset to the left as a result of the fixed bias) in order to prevent spurious tripping of the network protector.

Accordingly it is a further object of my invention to provide a network protector with a power directional unit which is more sensitive to highly capacitive current than prior art units and which does not result in the network protector's opening in response to very small currents, irrespective of their phase displacement.

SUMMARY OF THE INVENTION

Briefly, this invention contemplates use of circuitry for providing the power directional unit of a static protective relay with a variable bias in addition to a fixed bias. The variable bias when combined with a fixed bias provides a directional unit with a trip characteristic which is offset to the left of origin in the immediate vicinity thereof (like that of the above noted Waldron patent) but which is shifted to the right towards the 270° line at points somewhat remote from the origin. To accomplish this end the source of the variable bias comprises circuitry for providing a bias signal which varies both in magnitude and in phase and is a function of the phase angle of the phase current.

BRIEF DESCRIPTION OF THE DRAWINGS

The subject matter of the invention is particularly pointed out and distinctly claimed in the concluding portion of the specification. For a more complete understanding of the invention together with further objects and advantages thereof, reference should be made to the following description taken in conjunction with the accompanying drawings in which:

FIG. 1 is a single line schematic diagram of a typical alternating current secondary network system;

FIG. 2 is a functional block diagram of a preferred embodiment of the power directional unit of this invention;

FIG. 3 is a schematic diagram of a portion of the power directional unit shown in FIG. 2;

FIG. 6 is a plurality of graphs of voltage wave forms of the power directional unit for the system condition wherein the phase current lags the phase voltage by 90°;

FIG. 7 is a plurality of graphs of wave forms of the power directional unit for the system condition wherein the phase current lags the phase voltage by 120°;

FIG. 8 is a generalized response curve for the power directional unit like that shown in the Waldron patent;

FIG. 9 is a generalized response curve for the power directional unit of this invention.

DESCRIPTION OF THE PREFERRED EMBODIMENTS

Figure 4:
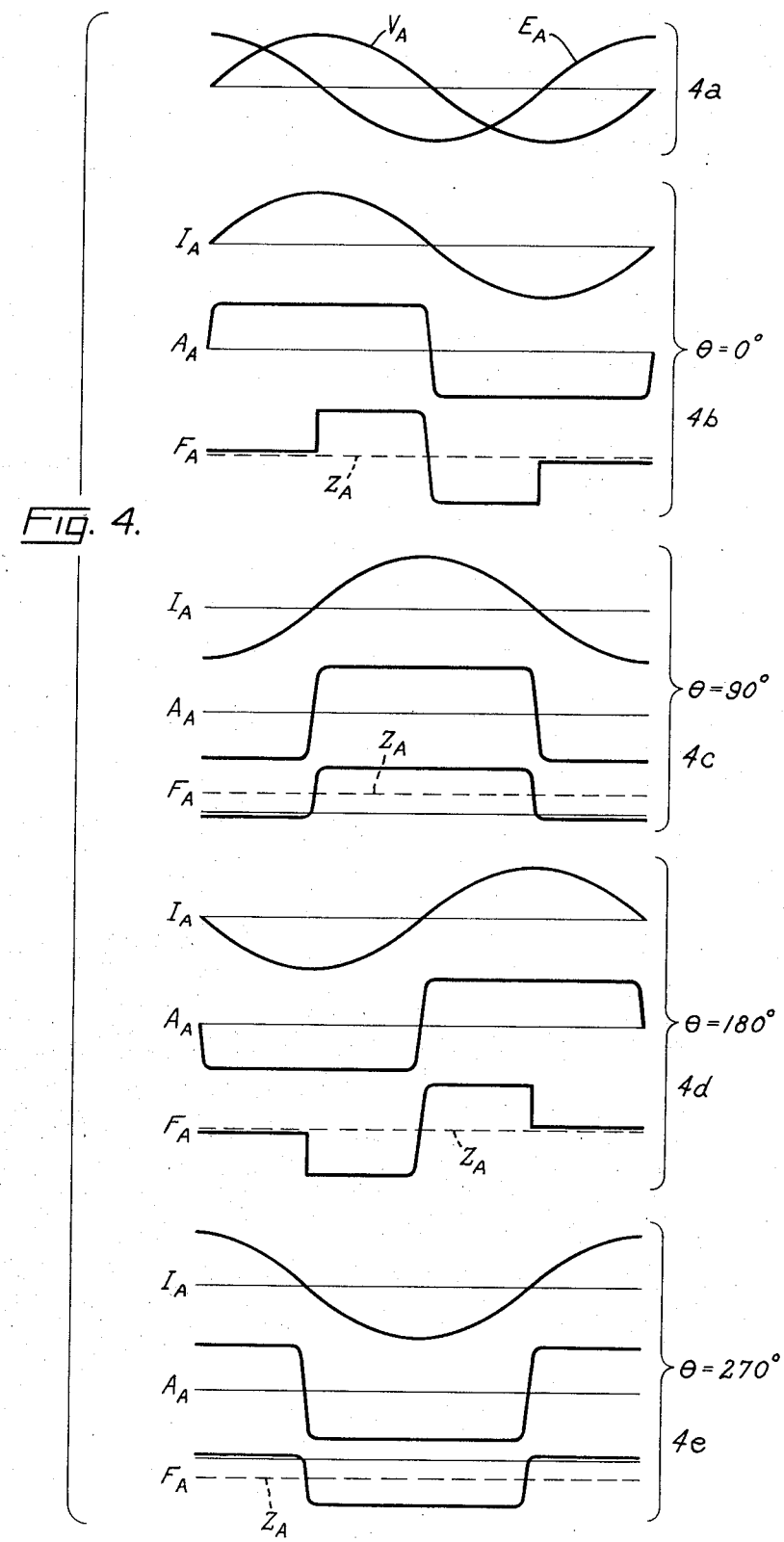
FIG. 4 is a group of graphs depicting variable bias signals for a plurality of current phase angle conditions.

Now turning to the drawings, FIG. 1 shows an alternating current secondary network system. While this invention will be described clearly understood that the teachings thereof are applicable to any multiphase system in which reverse power flows might occur. Included is a primary voltage bus 1 of a distribution substation and 2 primary feeders 2 and 3 which are connected to the bus 1 through 2 station circuit breakers 4. The alternating current secondary network is generally represented by numeral 5 and comprises a plurality of interconnected cables 6 which are connected to primary feeders 2 and 3 at a plurality of points. Each connection to the primary feeders is made by a network transformer 7 through a network protector 8, and a set of fuses 9. Connected to secondary network cable 6 are a plurality of load feeder circuits 10.

A network protective relay is associated with each network protector to control that protector in accordance with established power company practice. The desired functions of such a relay are normally as follows:

a. the relay should open the network protector upon the occurrence of any reverse power flow above a certain magnitude to its primary feeder to disconnect only that feeder from the alternating current secondary network 5;

b. the relay should not open the network protector 8 upon the occurrence of a fault in the secondary network 5 to ensure continuity of service (these secondary faults are cleared either by burning themselves clear, by the set of fuses 9 used in conjunction with each network protector 8, or by other disconnecting devices in the load feeder circuits 10); and c. the relay should be sensitive enough to open the network protector 8 on the magnetizing current of the transformer 7 when one of the station breakers 4 is open.

To achieve these functions, this invention contemplates a static protective relay, which includes a power directional unit 11 controlling the network protector or circuit breaker 8. To that end the power directional unit 11 is adapted to provide a trip signal to the network protector to cause the latter to open and thereby disconnect the network 10 from its transformer.

As can be seen in FIG. 2, power directional unit 11 includes three duplicate circuits. Circuit 11A is operative for monitoring the phase A's current and voltage. Circuit 11B monitors phase B's current and voltage and circuit 11C monitors phase C's current and voltage. Each of the circuits 11A, 11B, and 11C provides an output signal $X_A$, $X_B$ and $X_C$, respectively, which is proportional to the real power through the network protector 8. The derivation of the output signal $X_A$ of circuit 11A will be considered in detail hereinafter. It is of course to be understood that the output signals from circuits 11B and 11C are derived in a similar manner.

Figure 5:
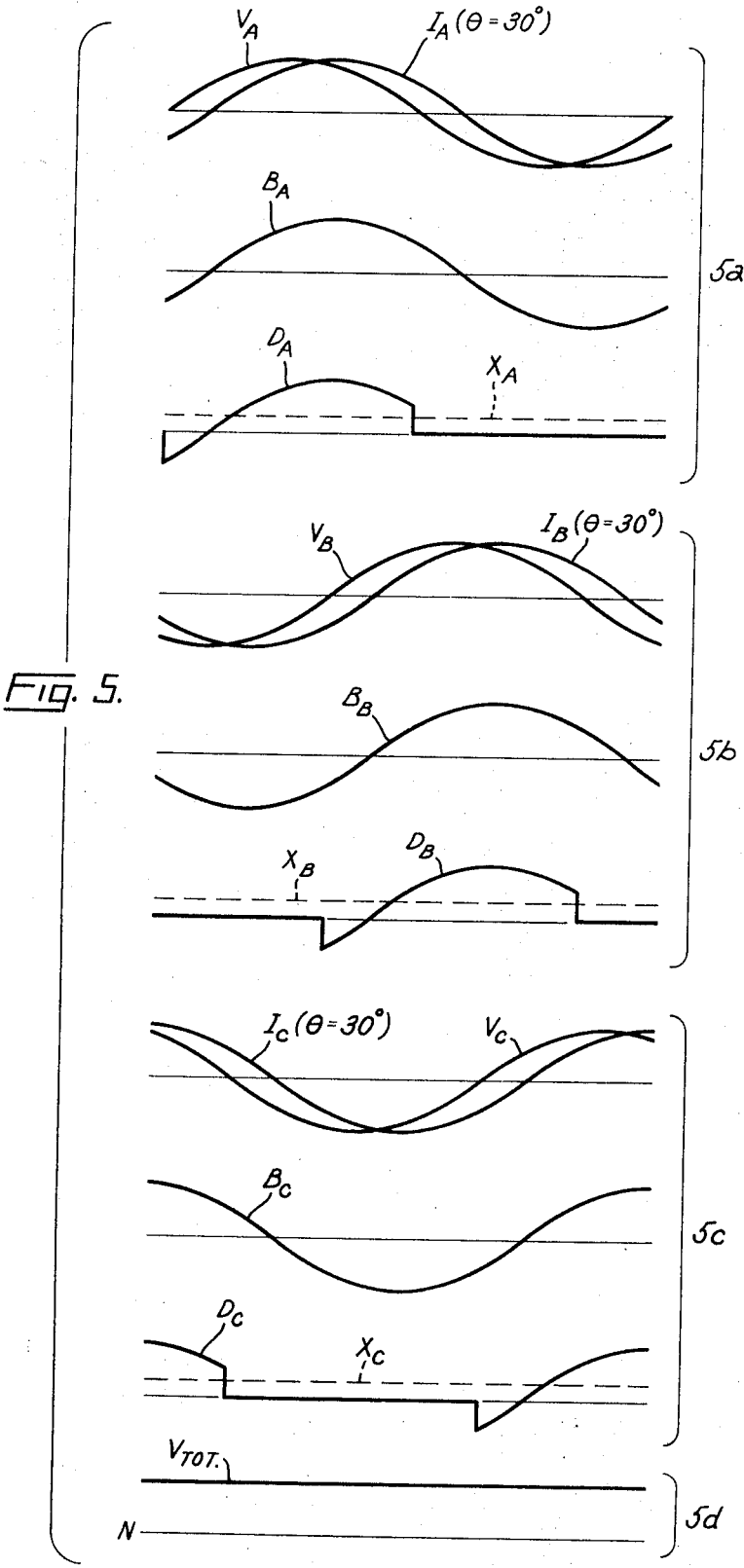
FIG. 5 is a plurality of graphs of wave forms of the power directional unit for the system condition wherein the phase current lags the phase voltage by 30°.

As can be seen circuit 11A includes a current monitor 12 which continually monitors the phase A current and which is coupled to a function generator or variable attenuator 13. The variable attenuator provides two output signals A and B. Output signal A is fed into modulator 14 and output signal B is fed into a modulator 15. Modulator 15 has a second input terminal for receipt of a signal C. Signal C is derived from a voltage monitor 16 which continually monitors the phase A voltage. The output signal, D, of modulator 15 is passed through a low pass filter 17 and emerges as an output signal $X_A$. The production of the output signal $X_A$ for various amounts of phase current displacement (data) will best be understood with reference to the functional block diagram of FIG. 2 and to the graphs of FIGS. 5, 6 and 7.

Assuming that the current in each phase lags the voltage by 30° ($\theta$ equals 30°) as is shown in FIG. 5A, the variable attenuator 13 provides a voltage signal $B_A$ which is a function of the phase current $I_A$. Output signal $B_A$ is supplied as one input of modulator 15. The function of the modulator 15 is to produce a bipolarity output voltage whose average value is proportional in sense and magnitude to the real power in its associated phase (i.e. phase A). To accomplish this result the modulator is fed with a pair of balanced modulating voltages +C and −C. The modulating voltages are derived from the phase voltage $V_A$ and are in phase therewith. In essence the modulator acts as a switch, allowing the input signal B to be present at its output whenever the modulating voltage C is positive. As was analytically shown in the above noted Waldron patent the output signal B represents the quantity KI cos $\theta$ where K is the constant, I is the phase current and $\theta$ is the angle between the current I and the voltage V and if the phase voltage is fairly constant KI cos $\theta$ closely approximates real power flow (VI cos $\theta$). The output of modulator 15 is filtered through a low pass filter 17 to provide an output signal $X_A$ which is the average value of the modulator output $D_A$.

In a similar manner circuit 11B provides an output signal $X_B$ which is the average value of the output signal $D_B$ of its modulator (not shown) and circuit 11C provides an output signal $X_C$ which is the average value of the output signal $D_C$ of its modulator (not shown).

Signals $X_A$, $X_B$ and $X_C$ are supplied as inputs to an adder circuit 20. The adder circuit algebraically combines all of the input signals to provide an output signal O equal to their algebraic sum.

A slightly positive polarity, fixed bias signal Y is provided as another input to the adder circuit 20. The fixed bias signal is utilized to desensitize the power directional unit so that tripping will not occur in response to an extremely low level reverse power flow.

Further input signals $Z_A$, $Z_B$, and $Z_C$ are provided to the adder circuit 20 but such signals will be ignored for the present (a discussion of their effect upon the power directional units' operation will be deferred until later).

A polarity detector 21 is connected to the adder 20. The polarity detector is designed to provide a trip signal whenever the output signal O from the adder circuit is negative.

When the sum of the inputs to the adder circuit other than the fixed bias are more negative than the magnitude of the fixed bias signal the output of the adder will be negative and a trip signal given.

As can be seen when $\theta$ equals 30°, signals $X_A$, $X_B$ and $X_C$ are all positive and therefore their sum (denoted as $X_{TOT}$ and shown in FIG. 5D) is also positive. The positive condition is indicative of a real power flow through the network protector and since the sum total of the inputs to the power directional unit are positive tripping will not occur.

FIG. 6 is a plurality of wave forms indicative of signals in the power directional unit 11 whenever the phase current lags the voltage 90°. As can be seen the average value of the output voltages $D_A$, $D_B$ and $D_C$ are all zero. Hence $X_{TOT}$ is zero. This condition indicates that reactive power is flowing through the network protector. In this situation the sum total of all of the inputs to adder 20 will be slightly positive (due to the positive fixed bias signal) and tripping will not occur.

FIG. 7 is a plurality of wave forms indicative of signals in the power directional unit 11 whenever the phase current lags the voltage by 120°. As can be seen the average value of each of the output voltages $D_A$, $D_B$ and $D_C$ is negative, hence $X_{TOT}$ is negative. This condition indicates that reverse power is flowing through the network protector. In this situation the sum total of all the input voltages to adder 20 will be negative, notwithstanding the slight positive bias provided by the fixed bias Y, and thus the trip signal will be provided by polarity detector 21.

The tripping characteristic of a power directional unit of Waldron is shown in FIG. 8. As can be seen therein the trip line is shifted slightly to the left of origin by the amount equal to his fixed bias (which is supplied by his potentiometer 49).

Any current vector plotted from origin which terminates in the area to the left of the trip line will result in the production of a trip signal by Waldron's power directional unit.

As should be appreciated, in situations where the current flowing through the network protector is highly capacitive (i.e. is close to but slightly less than 270°) the power directional unit of Waldron may not provide a trip signal.

In accordance with one aspect of my invention I provide a variable bias in the power directional unit along with a fixed bias to provide the unit with a tripping characteristic exhibiting greater sensitivity to highly capacitive phase current than would otherwise exist through the use of a fixed bias alone.

The variable bias varies in magnitude and phase and is a function of a phase angle of the current and when combined with a fixed bias signal Y it provides the power directional unit with a tripping characteristic as shown in FIG. 9.

The variable bias signals are provided for each phase by a portion of the respective circuits 11A, 11B, and 11C.

As can be seen in FIG. 2 the phase A voltage $V_A$ is monitored by voltage monitor 16. A function generator or phase shifter 18 provides a signal $E_A$ which is of the same frequency as the voltage $V_A$ but which is shifted in phase by 90° leading. Signal $E_A$ serves as a modulating signal for modulator 14. The output A of the variable attenuator 13 is a function of the phase current $I_A$ and serves as the signal input to the modulator 14.

In essence modulator 14 acts as a switch allowing the input voltage $V_A$ to be present at its output whenever the modulating signal is negative (i.e. whenever the phase voltage is between 90° and 270°).

The output $F_A$ of the modulator 14 is passed through a low pass filter 19 to provide an output signal $Z_A$ which is the average value of the output signal $F_A$.

When arranged in this manner the output signal $F_A$ of modulator 14 will be zero whenever the phase current is in phase with the voltage or lags it by 180°. When the phase current lags the phase voltage by 90° the average value of the output will be positive and when the phase current lags the phase voltage by 270° the average value of the output will be negative.

FIG. 4 is a plurality of wave forms produced in the portion of the power directional unit which provides the variable bias for four possible phase current conditions. For example, FIG. 4B shows the condition wherein current $I_A$ is in phase with voltage $V_A$ (i.e. $\theta$ equals 0°).

As can be seen from FIGS. 2 and 4A voltage $V_A$ is supplied to function generator 18 which provides a signal $E_A$ which is displaced 90° leading with respect to $V_A$. This signal acts as the modulating signal for modulator 14. The input signal to modulator 14 consists of a signal $A_A$ which is a function of $I_A$. Signal $A_A$ is allowed to pass through modulator 14 whenever a modulating signal $E_A$ is negative. Accordingly, output signal $F_A$ is of the form shown in FIG. 4B. This output signal is passed through low pass filter 19 to provide a signal $Z_A$ which is the average value of $F_A$. As can be seen, for $\theta$ equal zero degrees $Z_A$ equals zero. Circuits 11B and 11C operate in the same manner and accordingly $Z_B$ and $Z_C$ equals zero when $I_B$ is in phase with $V_B$ and when $I_C$ is in phase with $V_C$.

Since signals $Z_A$, $Z_B$ and $Z_C$ are supplied as inputs to the adder 20 along with the fixed bias signal Y and the signals $X_A$, $X_B$ and $X_C$ it should be appreciated that when $\theta$ equals zero degrees the only adder inputs are Y and $X_A$, $X_B$ and $X_C$ since the variable bias signals are zero. Accordingly, at $\theta = 0°$ the tripping characteristic of my power directional unit will be the same as that of Waldron. In a similar manner when $\theta = 180°$ the variable bias signal is zero and the tripping characteristic is the same as Waldron's.

When the current in each phase lags the voltage therein by 90° a positive variable bias signal is created and supplied to adder 20. For example, as can be seen in FIG. 4C signal $A_A$, which is a function of $I_A$, is positive between 90° and 270° and is negative between zero degrees and 90° and between 270° and 360°. Accordingly, since $A_A$ is allowed to pass through modulator 14 only when $V_A$ is between 90° and 270°, the output signal $F_A$ is as shown (i.e. positive between 90° and 270° and approximately zero at all other times) and the average value thereof, $Z_A$, is positive. In a similar manner the average value of the output signals from circuits 11B and 11C will also be positive and hence the total variable bias supplied to the adder 20 will be positive.

The positive variable bias in combination with the positive fixed bias Y in the adder serves to shift the trip characteristic of the power directional unit further to the left of the 90° line than would be the case in Waldron's unit. This can be appreciated when one realizes that in order for my polarity detector to provide a trip signal the sum of the signals $X_A$, $X_B$ and $X_C$ (which are indicative of power flow) must be more negative than the sum of the positive fixed and variable biased signals.

When current in each phase lags the voltage therein by 270° a negative variable bias signal is created and supplied to adder 20. For example, as can be seen in FIG. 4E, signal $A_A$, which is a function of $I_A$, is positive between zero degrees and 90° and between 270° and 360° and is negative between 90° and 270°. Accordingly, since $A_A$ is allowed to pass through modulator 14 only when $V_A$ is between 90° and 270° the output signal $F_A$ is as shown (i.e. negative between 90° and 270° and approximately zero at all other times) and the average value thereof, $Z_A$, is negative. In a similar manner the average value of the output signals from circuits 11B and 11C will also be negative and hence the total variable bias supplied to adder 20 will be negative.

The negative variable bias supplied to the adder tends to offset the positive fixed bias and thus serve to shift the tripping characteristic of my power directional unit to the right of the 270° line. Accordingly the power directional unit is capable of providing a trip signal when the phase current is highly capacitive. The current vector $I_A$ shown in FIG. 9 is indicative of this condition. It should be appreciated that without the variable bias as provided by my invention, vector $I_A$ would lie wholly outside the trip characteristic as defined by Waldron.

As can be seen from FIG. 8 the tripping characteristic of my power directional unit is like that of Waldron's in the immediate vicinity of the origin. By so doing spurious tripping is minimized if not precluded. To accomplish that end the variable bias signals which are produced are extremely small whenever the phase current is at low levels irrespective of the phase angle between the current and the voltage and are overshadowed by the fixed bias signal. A detailed explanation of this feature of my power directional unit will be considered later.

FIG. 3 is a schematic diagram of the circuitry making up some of the components shown in the functional block diagram of FIG. 2. As can be seen the voltage monitor comprises a potential transformer PT having two secondaries PT1 and PT2. The ends of secondary PT1 provide the positive and the negative modulating signals (+C, −C) for modulator 15. The input signal $B_A$ for the modulator is provided by the current monitor 12 and the variable attenuator 13.

The current monitor comprises a current transformer CT having a single secondary CT1. The variable attenuator 13 is connected across the output terminals of the secondary CT1 and comprises a voltage breakdown element or thyrite T connected in shunt across the series combination of a resistor R1 and the parallel combination of a resistor R2 and a pair of reverse poled diodes D1 and D2. The voltage signal appearing across this series combination is sinusoidal and is denoted as $B_A$. It serves as the input to modulator 15. The voltage signal appearing across the resistor R2 is denoted as $A_A$ and is either a sinusoid or a clipped sinusoid. It serves as the input to modulator 14. The thyrite is provided to protect the modulator from damage due to voltage surges. To that end it is designed to break down or conduct in the presence of such a surge.

Attenuator 13 provides a high gain in response to low phase current levels and a low gain in response to high levels of phase current. For example, for low levels of $I_A$ (e.g. as for example when magnetizing current is flowing from the network into the network transformer) diodes D1 and D2 appear as open circuits, hence, signal $B_A$ appears across the series combination of R1 and R2. When the phase current $I_A$ is high, diodes D1 and D2 conduct whereupon signal $B_A$ appears across only the resistor R1. Preferably resistor R2 is several times larger than R1 but is nevertheless of a small resistance (e.g. 75 ohms) so that the series combination of R1 and R2 does not provide a large burden on the secondary CT1. As is known a large burden on the secondary of the current transformer may introduce errors therein due to the effects of magnetizing current.

Sinusoidal voltage signal $B_A$ is provided as an input to modulator 15. As can be seen, modulator 15 comprises four diodes D4, D5, D6 and D7 connected in a bridge circuit. The signal $B_A$ is supplied to the leg of the bridge including diodes D4 and D5 and the output, $D_A$, is taken from legs D6 and D7. Modulating voltages +C and −C are connected to the legs including diodes D4 and D6 and diodes D5 and D7 through resistors R6 and R7, respectively.

When +C is positive all the diodes are forward biased. As a result, the input signal $B_A$ can flow through either one of two paths; through diodes D4 and D6, or through diodes D5 and D7. In effect the modulator is shorted and the input signal $B_A$ appears as output $D_A$. When +C becomes negative, all of the diodes are reverse biased and no input signal $B_A$ can be present at the output, $D_A$ equaling zero.

The modulator also includes the combination of a diode D8 connected in series with an oppositely poled zener diode ZD2 and connected in shunt with diode D4 − D5 and D6 − D7. The function of diode D8 and zener diode ZD2 is to limit reverse voltage applied to the modulator's diodes.

The output signal $D_A$ which is indicative the power flow through the network protector, is passed through a low pass filter circuit 17 to provide an output signal $X_A$ which is the average value of the signal $D_A$.

The filter 17 includes resistors R8, R9 and R10 and capacitors C3 and C4. It is to be understood that filter configurations other than shown may be utilized providing that their attenuation at the power frequency of 60 Hz is sufficient to ensure that only the average value signal $D_A$ be presented to the adder circuit 20.

The output signal $A_A$ from the variable attenuator is provided across resistor R2 and normally consists of a clipped sinusoidal signal like that shown in FIGS. 4B through 4E. This occurs in the following manner: When the magnitude of the alternating current flowing through phase A attains a certain level (i.e. the level at which diode D1 or D2 begin conducting) the transformed signal appearing across resistor R2 causes either diode D1 or D2 to begin conducting whereupon the transformed signal is clipped to provide an output signal $A_A$. In situations wherein the phase current is extremely small diodes D1 and D2 will not conduct and signal $A_A$ will be sinusoidal in shape but quite small in magnitude.

In any event signal $A_A$ is provided as the input to modulator 14. The modulating signal for this modulator is provided via the secondary PT2 of the potential transformer and the function generator or phase shifter 18. As can be seen, the function generator 18 comprises a capacitor C1. Accordingly, the current from the secondary PT2 which passes through C1 to modulator 14 is shifted in phase 90° leading with respect to the phase voltage. The current signal $E_A$ is supplied to the base of a transistor Q1 in the modulator 14. Transistor Q1 is arranged to be rendered conductive whenever the base current $E_A$ is positive. To that end the input signal $A_1$ is passed through a current limiting resistor R3 to the emitter of transistor Q1 the collector of which is connected to ground. As should be appreciated, whenever transistor Q1 is rendered conductive by the base current $E_A$ (i.e. when the phase voltage $V_A$ is between zero and 90° and between 270° and 360°) the signal $A_A$ is shunted to ground and the output signal $F_A$ of the modulator is approximately zero volts. During the interval when current $E_A$ is negative (i.e. when phase voltage $V_A$ is between 90° and 270°) the modulator allows signal $E_A$ to pass therethrough as output signal $F_A$.

As can be seen a back-to-back series combination of a diode D3 and a zener diode ZD1 is connected between the base and the collector of transistor Q1. This combination ensures that the base of transistor Q1 can go as far negative as the maximum negative excursion of the signal $A_A$.

The output signal $F_A$ is passed through a low pass filter 19 consisting of a resistor R4 and a capacitor C2 in order to provide a signal $Z_A$ which is the average value of the output signal $F_A$.

The average value signal $Z_A$ is supplied as an input signal to the adder circuit 20. In a similar manner the average value signal $Z_B$ produced by circuit 11B, and the average value signal $Z_C$, produced by the circuit 11C, are provided as inputs to the adder. As was previously noted average value signals $Z_A$, $Z_B$ and $Z_C$ are the variable bias signals of my power directional unit. The signals $X_A$, $X_B$ and $X_C$ which are provided by the power directional unit and which are indicative of the power flow through the network protector, and the fixed bias signal Y are also supplied as inputs to the adder circuit 20.

As can be seen the adder circuit 20 comprises seven resistors mainly R5, R11, R12, R13, R14, R15, and R16, arranged in a Kirchoff adder configuration. Accordingly, the output signal O of the adder is the algebraic sum of its input signals.

The output signal is supplied as an input to the polarity detector 21. The polarity detector as previously noted is designated to provide a trip signal whenever the input signal O is negative. To that end the polarity detector comprises an operational amplifier OA having two inputs (one input being signal O and the other input being ground). A resistor R17 is connected in shunt with the amplifier and defines the gain thereof. A capacitor C5 is connected in shunt with resistor R17 to eliminate any ripple current. In order to prevent the amplifier from saturating a pair of back-to-back zener diodes ZD3 and ZD4 are also connecting in shunt with the amplifier.

The trip signal produced by the amplifier serves to actuate the trip coil of the network protector whereupon the main contacts thereof open to isolate the network transformer from the network.

As previously noted it is desirable to have a tripping characteristic like that of Waldron in the immediate vicinity of the origin (i.e. for low values of phase current, I) in order that the network protector does not open in response to certain spurious conditions (i.e. tripping as a result of noise, or slightly overhauling motors etc.). My power directional unit accomplishes that design goal in the following manner: when the magnitude of phase current is extremely small, the sinusoidal signal $A_A$ (produced by function generator 13) is of such a small magnitude as compared to the magnitude of the fixed bias signal that even if allowed to pass through the modulator 14 as a variable bias input signal it will not have the effect of altering the tripping characteristic as defined by the fixed bias. Accordingly, portion P1 of my tripping characteristic as shown in FIG. 9 (which portion is indicative of extremely low phase current levels) will be the same as the characteristic of Waldron.

As the magnitude of the phase current increases so does the magnitude of the sinusoidal signal $A_A$ unit it is clipped by either diode D1 or D2. Therefore, when the peak magnitude of signal $A_A$ is slightly less than the level at which clipping will occur, the portion of the signal $A_A$ which is allowed to pass by the modulator will effect some alteration of the tripping characteristic as defined by the fixed bias (some shifting of the tripping characteristic will occur). Accordingly, the portion P2 of my tripping characteristic (which portion indicates phase current level below the point at which the diodes D1 and D2 begin conducting) will begin to deviate from the characteristic of Waldron due to the beginning influence of my variable bias. When the phase current level reaches the magnitude at which diodes D1 and D2 conduct the variable bias signal reaches its maximum magnitude as a function of phase delay between the phase current and the phase voltage. Accordingly the portion P3 of my tripping characteristic (which portion indicates phase current levels above the point at which the diode D1 and D2 begin conducting) exhibits a fixed amount of deviation (equal to the amount of variable bias at that value of $\theta$) from the characteristic of Waldron.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A static relay responsive to the direction of electric power in an AC system comprising:
   a. first means for deriving from the system a first and second AC signal which are proportional to current flow therein;
   b. second means for modulating the first AC signal according to the polarity of a third AC signal proportional to the associated system voltage, said modulating means thereby producing a first output signal whose average value is proportional in magnitude and in sense to real power flowing in the system;
   c. means for producing a variable bias signal whose magnitude and polarity are a function of the phase angle between the system voltage and the system current;
   d. means responsive to the first output signal for providing a trip signal when the average value of the first output signal attains an established level, said level being a function of the average value of said variable bias signal.

2. The static relay as specified in claim 1 additionally comprising:
   e. means for providing a fixed bias signal, said level being a function of the average value of said variable bias signal and the value of said fixed bias signal.

3. The static relay as specified in claim 2 wherein a maximum variable bias signal is produced when the system current is at 270° with respect to the system voltage.

4. The static relay as specified in claim 2 wherein said variable bias signal producing means comprises:
   i. third means for deriving a fourth AC signal which leads the system voltage by approximately 90°; and
   ii. fourth means for modulating the second AC signal according to the polarity of the fourth AC signal to provide said variable bias signal.

5. The static relay as specified in claim 4 wherein said second means comprising a bridge circuit including diodes which conduct the first AC signal to the output when said third AC signal has a predetermined polarity.

6. The static relay as specified in claim 4 wherein said fourth means comprises a switch which when conductive prevents said second AC signal from passing through said means, said switch including control means to which said fourth AC signal is provided.

7. The static relay as specified in claim 5 wherein said variable bias signal producing means additionally comprises filter means for filtering said variable bias signal to provide a signal which is the average value of said variable bias signal.

8. The static relay as specified in claim 4 additionally comprising:
   f. signal combining means for providing a second output signal which is the algebraic sum in sense and magnitude of the average value of said first output signal, the average value of said variable bias signal, and the value of said fixed bias signal; and
   g. means for providing a trip signal when second output signal is of a predetermined polarity.

9. The static relay as specified in claim 4 wherein said first means comprises a current monitor coupled to a function generator, said function generator comprising a first resistor in series with a parallel combination of a second resistor and a pair of inverse-parallel connected diodes, said first AC signal being supplied across the series combination of said first resistor and said second resistor and said second AC signal being supplied across the second resistor.

10. The static relay as specified in claim 9 wherein said second resistor has a larger resistance than said first resistor.

11. The static relay as specified in claim 10 wherein said current monitor is a current transformer.

* * * * *